(12) United States Patent
Fallin et al.

(10) Patent No.: US 8,047,434 B2
(45) Date of Patent: Nov. 1, 2011

(54) KNOWN LOSS DATA LOGGING

(75) Inventors: David B. Fallin, Boynton Beach, FL (US); Scott Alan Tribbey, Coconut Creek, FL (US); John Clark, Boynton Beach, FL (US); Sean Ryan, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 298 days.

(21) Appl. No.: 11/665,912

(22) PCT Filed: Nov. 2, 2005

(86) PCT No.: PCT/US2005/039841
§ 371 (c)(1),
(2), (4) Date: Feb. 25, 2008

(87) PCT Pub. No.: WO2006/050463
PCT Pub. Date: May 11, 2006

(65) Prior Publication Data
US 2008/0308632 A1    Dec. 18, 2008

Related U.S. Application Data

(60) Provisional application No. 60/654,364, filed on Feb. 18, 2005, provisional application No. 60/654,365, filed on Feb. 18, 2005, provisional application No. 60/624,398, filed on Nov. 2, 2004, provisional application No. 60/624,401, filed on Nov. 2, 2004.

(51) Int. Cl.
*G06Q 20/00*    (2006.01)
*G06Q 30/00*    (2006.01)
(52) U.S. Cl. ............................. 235/385; 705/22; 705/28
(58) Field of Classification Search .................. 235/385; 705/22, 28
See application file for complete search history.

(56) References Cited

U.S. PATENT DOCUMENTS

| | | | |
|---|---|---|---|
| 6,540,143 B1 * | 4/2003 | Matsumori | 235/462.13 |
| 2004/0002998 A1 * | 1/2004 | Takahashi et al. | 707/104.1 |
| 2004/0143505 A1 * | 7/2004 | Kovach | 705/23 |

* cited by examiner

*Primary Examiner* — Jamara Franklin

(57) ABSTRACT

System and method for collecting information pertaining to a defeated electronic article surveillance (EAS) tag are disclosed. The method includes the steps of providing a recording unit for collecting data pertaining to missing merchandise having at least one user interface, recording the data into the recording unit in response to a series of user interface prompts displayed on the recording unit, the interface prompts being programmed according to a predetermined user input sequence, the recording unit being adapted to transmit the data through a communications network, and transmitting the data through the communications network to a data processing unit, the data processing unit being configured to analyze the data and to generate a report based on the data.

24 Claims, 6 Drawing Sheets

KNOWN LOSS DATA LOGGING

CROSS REFERENCE TO RELATED APPLICATION

The present application claims a benefit of priority to U.S. Provisional Application Ser. No. 60/624,401 filed on Nov. 2, 2004 entitled "Defeated EAS Tag Data Logging" by Scott A. Tribbey et al., U.S. Provisional Application Ser. No. 60/654,365 filed on Feb. 18, 2005 entitled "Defeated EAS Tag Data Logging" by Scott A. Tribbey et al., U.S. Provisional Application Ser. No. 60/624,398 filed on Nov. 2, 2004 entitled "Empty Package Data Logging" by Scott A. Tribbey et al. and U.S. Provisional Application Ser. No. 60/654,364 filed on Feb. 18, 2005 entitled "Empty Package Data Logging" by Scott A. Tribbey et al., the entire contents of all of which being incorporated by reference herein.

BACKGROUND

1. Field of the Invention

This invention relates to an electronic article surveillance (EAS) system and more specifically to an EAS system for logging data relating to missing merchandise, including information pertaining to defeated EAS tags and discarded merchandise packaging.

2. Description of the Relevant Art

Electronic Article Surveillance (EAS) systems are detection systems that allow for identification of an EAS tag within a given detection region. EAS systems have many uses, but most often they are used as security systems for preventing shoplifting in stores or removal of property in office buildings. EAS systems come in many different forms and make use of a number of different technologies.

A typical EAS system includes an electronic detection unit, EAS tags, and a detacher or deactivator. The detection units form an EAS tag detection region and are usually placed in high traffic areas, such as entrances and exits of stores or office buildings. The EAS tags have special characteristics and are specifically designed to be affixed to or embedded in merchandise or other objects sought to be protected. When an active EAS tag passes through the EAS tag detection region, the EAS system sounds an alarm, e.g., audio and/or visual alarm, to indicate the removal of the EAS tag from the proscribed area.

Conventional EAS systems operate using a transmitter and a receiver. Typically the transmitter is placed on one side of the detection region and the receiver is placed on the opposite side of the detection region. In the case of a retail store, this detection region is usually formed at a checkout aisle or an exit. When an EAS tag enters the detection region, the EAS tag has a characteristic response to the exciter signal which can be detected. For example, the EAS tag may respond to the signal sent by the transmitter by using a simple semiconductor junction, a tuned circuit composed of an inductor and capacitor, soft magnetic strips or wires, or vibrating resonators. This characteristic response is subsequently detected by the receiver.

However, even these systems can be circumvented by simply detaching and/or destroying the EAS tags so that the items can be removed without triggering the EAS system. In addition, it is possible to avoid detection by the EAS systems simply by removing the merchandise from its packaging and discarding the packaging. Since it is not possible to track defeated EAS tags or discarded merchandise packaging using existing EAS systems, users of the EAS systems, e.g., department stores, have been unable to address this problem.

Currently there are no means available to correlate information about missing merchandise or known loss merchandise (e.g., information relating to the defeated EAS tags, empty packaging and the discarded merchandise packaging) into any meaningful form. Thus, useful information, such as patterns in theft locations or times has never been isolated. Some stores attempted to gather such data by logging the information relating to the missing merchandise in a paper notebook. However, this method is time consuming and is prone to recording and transcription errors. In addition, it suffers from a lack of consistent reporting standards and provides no processing for the information which would allow the EAS system users to isolate the shoplifting patterns within their facilities. Therefore, there is a need for a system and method to log the data concerning missing merchandise, more specifically, information relating to defeated EAS tags and discarded merchandise packaging.

SUMMARY

A system and method for preventing shoplifting and tracking losses, more specifically capturing and recording information concerning missing merchandise including information pertaining to the defeated EAS tags and discarded merchandise packaging are disclosed. The system includes a recording unit for logging data specific to the missing merchandise or known loss merchandise. The recording unit presents a user with a series of input user screens including queries displayed according to a user input sequence. The user enters the data by choosing one of the corresponding response selections. The recording unit then transmits the recorded data to a data processing unit where the data is analyzed and a report is generated.

According to one aspect of the present disclosure, method for collecting information pertaining to a defeated electronic article surveillance (EAS) tag is disclosed, the method includes the steps of providing a recording unit for collecting data pertaining to missing or known loss merchandise having at least one user interface, recording the data into the recording unit in response to a series of user interface prompts displayed on the recording unit, the interface prompts being programmed according to a predetermined user input sequence, the recording unit being adapted to transmit the data through a communications network, and transmitting the data through the communications network to a data processing unit, the data processing unit being configured to analyze the data and to generate a report based on the data.

According to another aspect of the present disclosure, a system for collecting information pertaining to a defeated electronic article surveillance (EAS) tag is disclosed, the system includes a recording unit for collecting data pertaining to missing merchandise having at least one user interface to record the data into the recording unit in response to a series of user interface prompts displayed on the recording unit, the interface prompts being programmed according to a predetermined user input sequence, the recording unit being adapted to transmit the data through a communications network, and a data processing unit to receive and process the data, the data processing unit being configured to analyze the data and to generate a report based on the data.

According to a further aspect of the present disclosure, a set of computer-executable instructions for collecting information pertaining to a defeated electronic article surveillance (EAS) tag is disclosed, the set of computer-executable instructions includes the steps of recording data pertaining to missing merchandise into a recording unit in response to a series of user interface prompts displayed on the recording unit, the interface prompts being programmed according to a predetermined user input sequence, the recording unit being adapted to transmit the data through a communications network, and transmitting the data through the communications network to a data processing unit, the data processing unit being configured to analyze the data and to generate a report based on the data.

According to a final aspect of the present disclosure, a method for determining identity of repeat shoplifters is disclosed, the method includes the step of: collecting first data pertaining to a transaction in a point of sale station, the point of sale station adapted to transmit the data through a communications network. The method also includes the step of: recording second data pertaining to missing or known loss merchandise into the recording unit in response to a series of user interface prompts displayed on the recording unit, the interface prompts being programmed according to a predetermined user input sequence, the recording unit being adapted to transmit the data through a communications network. The method also includes the step of: transmitting the first and second data through the communications network to a data processing unit, the data processing unit being configured to determine identity of repeat shoplifters by correlating first and second data.

BRIEF DESCRIPTION OF THE DRAWINGS

Various embodiments of a system and method for data logging of EAS tags are described herein with reference to the drawings wherein.

DETAILED DESCRIPTION

Particular embodiments of the present disclosure will be described hereinbelow with reference to the accompanying drawings. In the following description, well-known functions or constructions are not described in detail to avoid obscuring the present disclosure in unnecessary detail.

A system and method for logging data pertaining to missing or known loss merchandise are disclosed. As used herein, the term "known loss" merchandise relates to merchandise which is known to be shoplifted in some fashion and which is usually evidenced by empty packaging, a discarded tag or a dismantled or otherwise deactivated tag. The data includes information concerning defeated EAS tags and discarded merchandise packaging. In general, the system includes an event recording unit having a user interface for displaying input screens according to a predetermined user input sequence and entering data specific to the missing merchandise in response thereto. The recording unit transfers the data to a data storage facility for data processing and report generation. The report describes trends and specific areas associated with the defeated EAS tags and/or discarded packaging.

Figure 1:
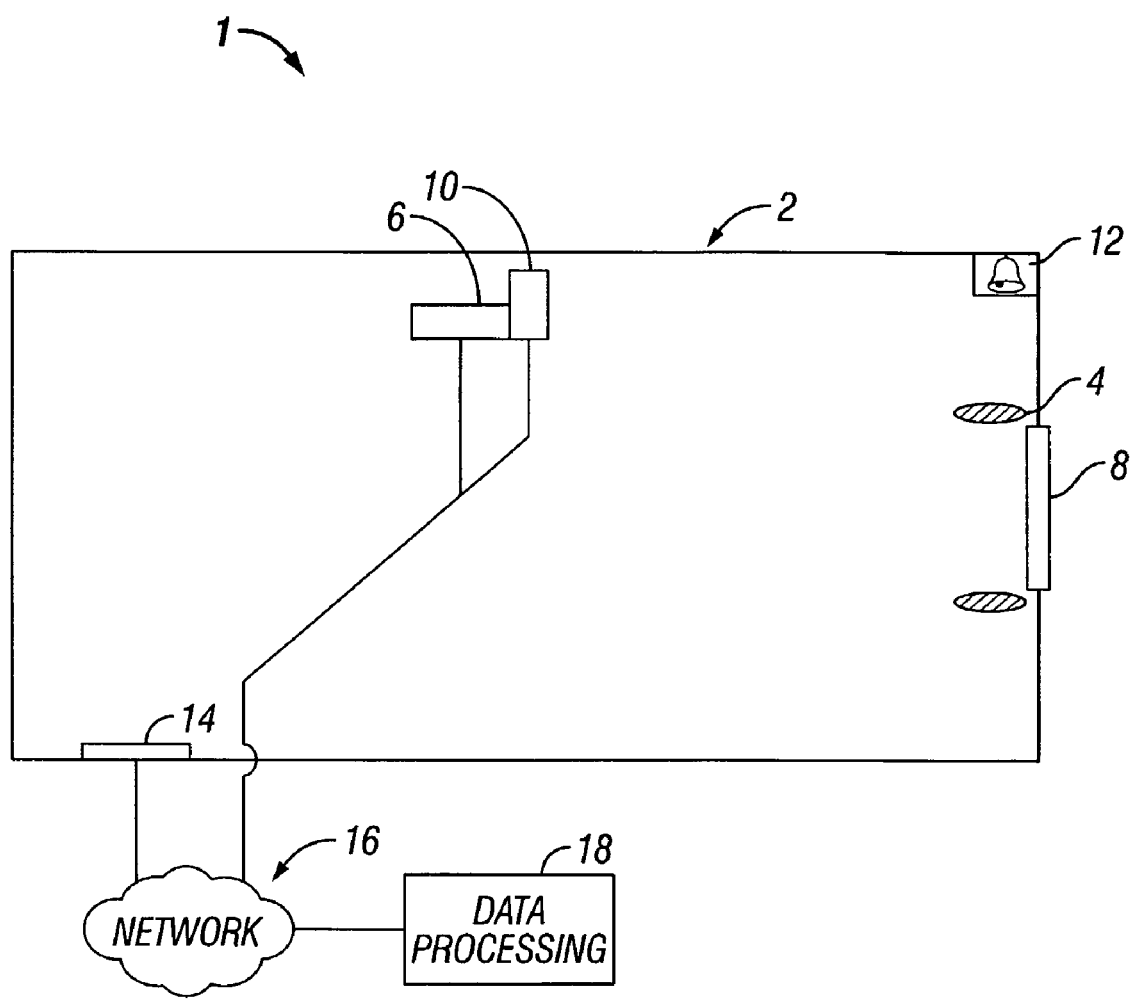
FIG. 1 is a schematic block diagram of a system for data logging of EAS tags.

More particularly and with specific reference to the figures, FIG. 1 shows a data logging system 1 for recording data relating to a defeated EAS tag. The system 1 is deployed in a retail environment, e.g., a department store 2. Those skilled in the art will understand that the system 1 may be deployed in a plurality of settings where EAS systems are usually installed. The store 2 may include a plurality of departments, e.g., men's apparel, women's apparel, electronics, etc. In addition, those departments may be subdivided into predetermined areas, e.g., shoes, fitting rooms, active wear, isles, etc. The store 2 includes a plurality of EAS tags affixed to or embedded in the store's merchandise and/or the merchandise's packaging in order to prevent shoplifting. Those skilled in the art will appreciate that the EAS tags may be any EAS anti-theft device, such as a label or other more sophisticated devices having an outer casing and a plurality of metallic strips.

The system 1 includes a detection unit 4, a point-of-sale ("POS") station 6, a deactivator 10, and an alarm unit 12. As used herein, the term deactivation may relate to a label deactivation in a conventional sense or a tag detacher. The detection unit 4 includes a transmitter and a receiver forming a predetermined EAS tag detection region. The transmitter produces a predetermined exciter signal in the detection region. As a result, an active EAS tag (e.g., a non-deactivated or non-defeated EAS tag) passing through the detection region responds to the exciter signal which is recognized by the detection unit 4. In that event, the detection unit 4 sends a signal to the alarm unit 12 to generate an alarm, e.g., audio and/or visual alarm. The detection region is located around or in proximity to an exit 8. Placing the detection unit 4 in a high-traffic area increases the chances of detecting shoplifted merchandise.

Merchandise can be removed from the store 2 if the EAS tag, which is usually attached to the merchandise or the packaging, is deactivated. The deactivator 10 is located near the POS station 6 so that the EAS tag deactivation occurs concurrently with the merchandise sale transaction. The deactivator 10 deactivates EAS tags using any number of methods, such as physical removal of the EAS tag from the merchandise (e.g., an EAS tag attached to apparel) or electronic deactivation of the EAS tag, so that the EAS tag remains on the merchandise but will not respond to the exciter signal (e.g., an EAS tag attached within a DVD case).

Another way that merchandise can be removed from the store 2 is if the EAS tag is defeated. This may occur if the EAS tag is removed from the merchandise, the EAS tag is destroyed, or the merchandise is removed from the packaging which is thereafter discarded. Once the EAS tag has been defeated, the merchandise can be easily stolen since the removal of merchandise from the store 2 will no longer trigger the alarm unit 12. The merchandise packaging and the defeated EAS tag is usually discarded in the store 2 where it is subsequently located by the employees of the store 2. It is contemplated that, when the defeated EAS tags and the discarded merchandise packaging are located throughout the store, the information concerning the missing merchandise is logged using the data logging system 1 according to the present disclosure.

Figure 2:
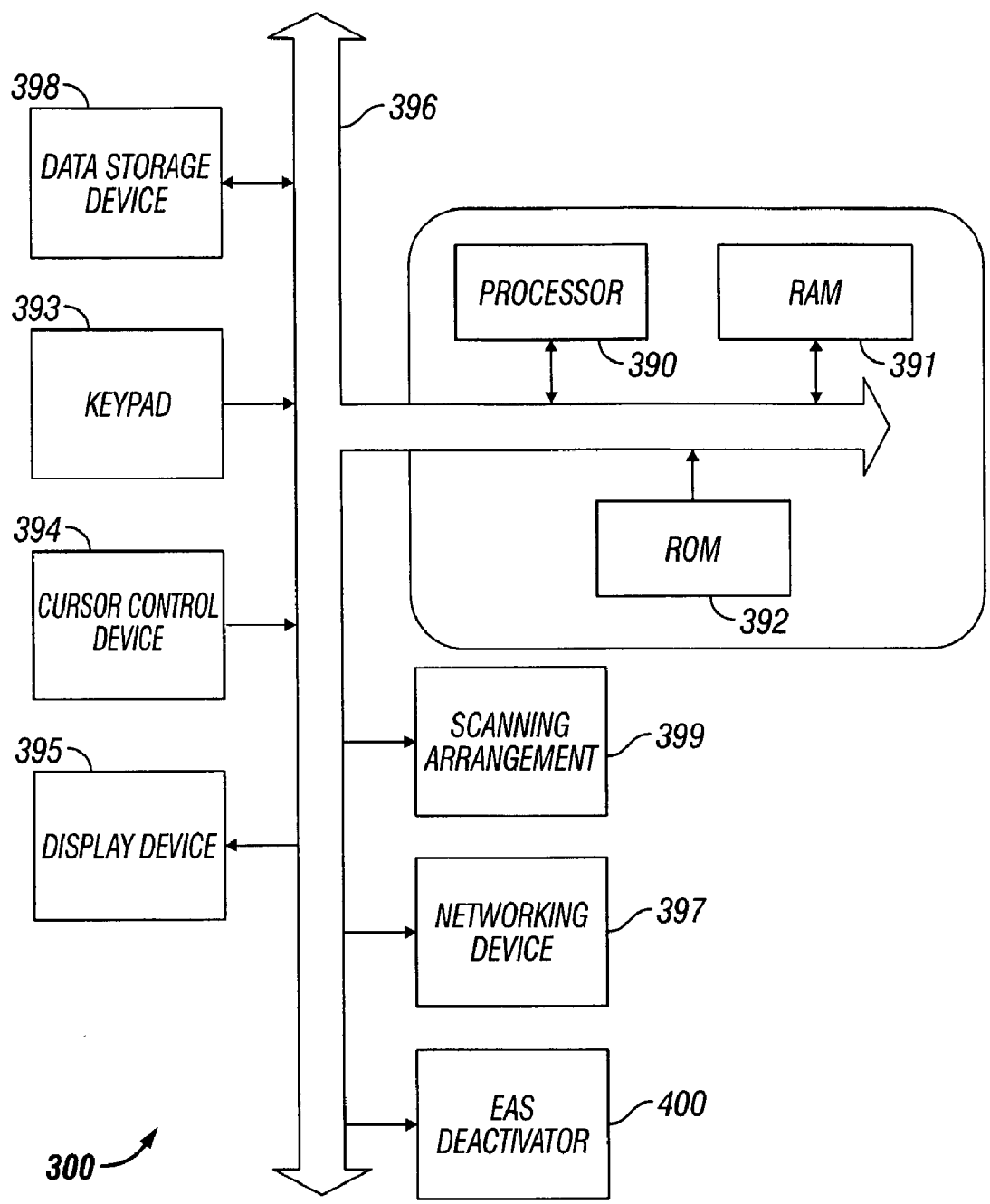
FIG. 2 is an exemplary computing system for implementing the present disclosure.

More particularly, the system 1 is configured to allow a user to log data relating to missing merchandise, including data concerning the defeated EAS tags and the discarded merchandise packaging. The system 1 includes an event recording unit 14 connected to a communications network 16 and a data processing unit 18. The recording unit 14 may be a computing device (e.g., a computing device 300 shown in FIG. 2) embodied in a variety of ways. It is to be appreciated that the type of the device which embodies the recording unit 14 depends on the environment in which it is being utilized. For some retail establishments a wall-mounted terminal is desirable while in other locations a mobile unit which provides increased portability which potentially could be at the expense of processing power may be more suitable.

It is to be understood that the present disclosure may be implemented in various forms of hardware, software, firmware, special purpose processors, or a combination thereof. In one embodiment, the present disclosure may be implemented in software or firmware as an application program tangibly embodied on the computing device 300.

The computing device 300 may include one or more central processing units (CPU) 390, a random access memory (RAM) 391, a read only memory (ROM) 392 and input/output (I/O) interface(s) such as a keypad 393, cursor control device 394 (e.g., a mouse, joystick, touchscreen, etc.), a data storage device 398, and display device 395. Furthermore, the computing device 300 may also include a scanning arrangement 399 configured to scan labels (e.g., UPC codes) from the merchandise or the packaging or another type of a data collection device (e.g., optical reader). The computing device 300 also includes a networking device 397 which provides wired or wireless connectivity to the network 16. In addition, various other peripheral devices may be connected to the computing device 300 by various interfaces and bus structures, such as a parallel port, serial port or universal serial bus (USB). A system bus 396 couples the various components and may be any of several types of bus structures including a memory bus or memory controller, a peripheral bus, and a local bus using any of a variety of bus architectures.

The computing device also includes an operating system and micro instruction code. The various processes and functions described herein may either be part of the micro instruction code, firmware, or part of the application program (or a combination thereof) which is executed via the operating system. In addition, the computing device 300 includes software for displaying user input screens and recording user responses, which is discussed below.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure. The data logging method of the present disclosure may be used at several levels, including operating system, application, or application components.

It is also envisioned that the recording unit 14 may include an EAS deactivator 400 which would allow the recording unit 14 to disable removed EAS tags which may still be operational. This prevents the disengaged tags from activating false alarms within the EAS system. The EAS deactivator 400 is connected to the other components of the EAS system either through a wireless or a wired medium in order make EAS deactivations.

The recording unit 14 allows a user (e.g., owner or employee of the store 2) to uniformly and automatically record data relating to missing merchandise whenever a defeated EAS tag or discarded merchandise packaging is found (e.g., location, time, date of discovery, method used to defeat the EAS tag, UPC code on the discarded merchandise packaging, etc.). Once it is discovered that merchandise is missing the user accesses the recording unit 14 using the keypad 393 and enters the data or information pertaining to the missing merchandise into the recording unit 14, as discussed in more detail below. The store 2 may include a plurality of the recoding units 14 placed throughout the facility or if the recording unit 14 is a mobile device, a plurality thereof may be distributed to the staff of the store 2. Multiple recording units 14 allow for easier access to the employees, which in turn, allows for more frequent data entries. After the data is entered, the recording unit 14 transmits the data to the data processing unit 18 using the network 16.

The network 16 may be a local area network (LAN), wide area network (WAN), the Internet or any known network that couples a plurality of computing devices to enable various modes of communication via network messages. For example, the network 16 may be a corporate intranet including a single server and multiple personal computers housed within a single facility, or alternatively, multiple servers with multiple personal computers located in various geographic locations. The network 16 may interconnect a plurality of computing device located within the store 2 (e.g., POS station 6, the deactivator 10, the recording unit 14, the data processing unit 18, etc.) This allows for the interconnected devices to communicate with each other and share data.

The data processing unit 18 may be a central server which is part of a data storage facility for the store 2. The data processing unit 18 processes the data concerning the defeated EAS tags transmitted from the recording unit 14 and compiles the data in a predetermined format. In addition, the data processing unit 18 may have access to other types of data related to the store 2, (e.g., store occupancy, POS transactions, EAS tag deactivations, etc.) obtained from the POS station 6 or other devices connected to the network 16. The data processing unit 18 may combine such information with the data received from the recording unit 14 to generate reports concerning shoplifting trends in the store 2 as discussed in more detail below.

Figure 3:
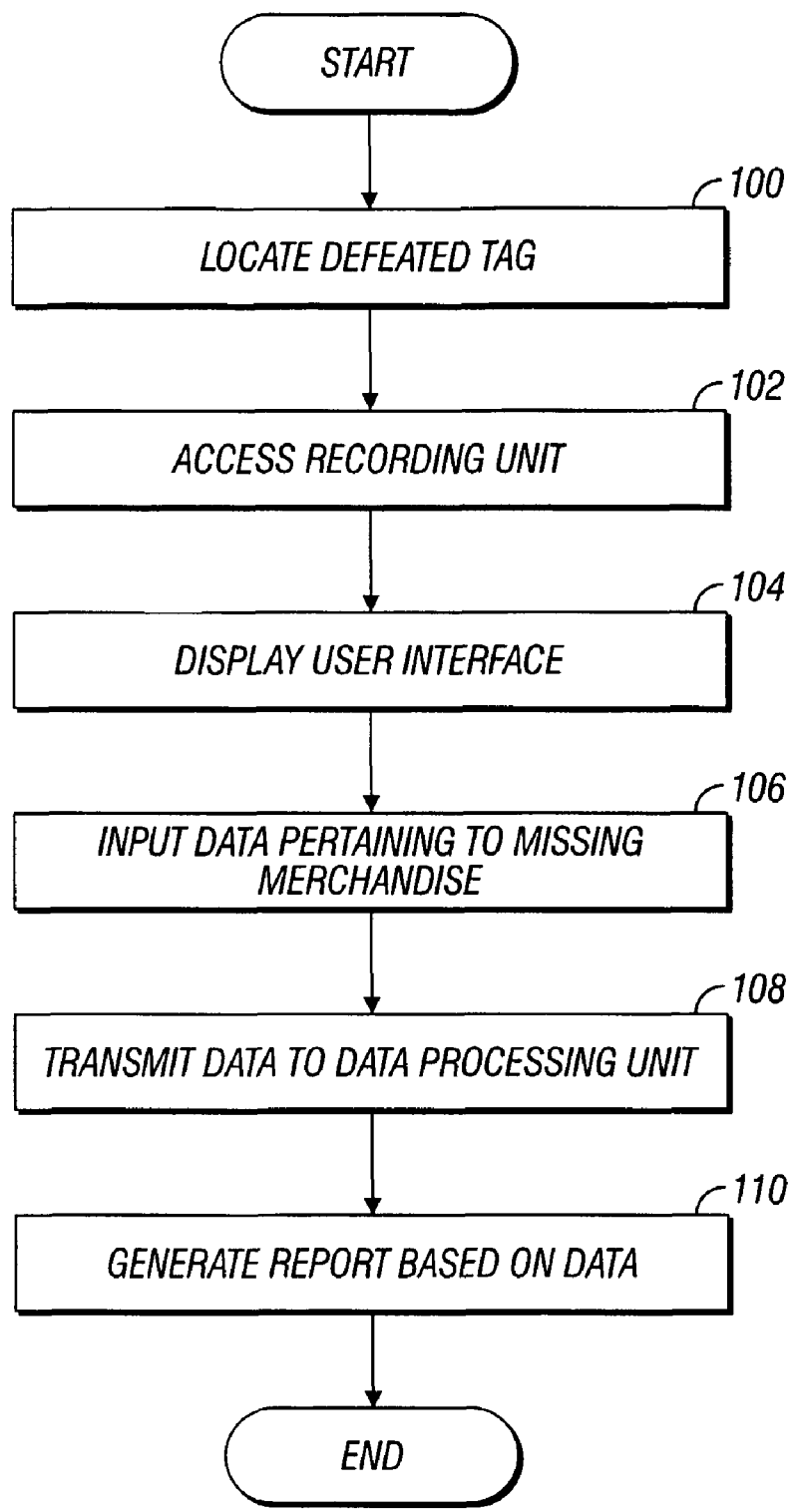
FIG. 3 is a flow diagram showing a method for data logging of EAS tags.

FIG. 3 shows a method for data logging EAS tags. The method of FIG. 3 will be discussed in conjunction with FIGS. 4A-C which show an exemplary output of a user interface for logging data concerning defeated EAS tags and FIGS. 5A-C which show an exemplary output of a user interface for logging data pertaining to discarded merchandise packaging. More particularly, after initialization, in step 100, a defeated EAS tag or discarded packaging is located. This may be accomplished during regular inspections of the store 2, e.g., a security guard patrol, a clerk stocking merchandise, etc. Once the traces of missing merchandise are discovered (e.g., a defeated EAS tag, discarded packaging) the employee (e.g., user) accesses the recoding unit 14 in step 102. This may involve the user to log in, e.g., provide user name and password. A log-in process prevents unauthorized persons from accessing the recording unit 14 which ensures that only accurate data is entered. In addition, it also allows the recording unit 14 to track the identity of the users.

Once the recording unit 14 is accessed, it displays a user interface as shown in FIGS. 4A-C and FIGS. 5A-C. In particular, the user interface has a predetermined input sequence which leads the user through a series of steps, during which information relevant to the missing merchandise is entered. In addition, the recording unit 14 time and date stamps the information.

In step 106, the user inputs the information relating to the missing merchandise through a user interface which displays input screens in a predetermined sequence. Initially, the user interface queries the user to input information by displaying a plurality of responses relating to how the missing merchandise was discovered. The user then selects a response describing which specific traces of missing merchandise were discovered (e.g., a defeated EAS tag, discarded packaging). Once the user makes that choice, the user interface displays a series of prompts which ask more detailed questions about the missing merchandise. Such information may include, but not limited to, the department of the store 2 and the area within the department where the defeated EAS tag or the discarded packaging was found, the method used to defeat the EAS tag, the UPC code/identification of the discarded packaging, number of defeated tags/discarded packaging.

The input screens may be linked in a tree structure, where a response from a previous query generates a follow up input screen according to a predetermined input sequence, for example, as shown in FIGS. 4B and 4C and FIGS. 5A and 5B. Those skilled in the art will appreciate that the input sequence may include additional input screens depending on the information requirements of the store 2. Furthermore, the input screens may be presented in a variety of formats.

Those skilled in the art will also appreciate that the user input interface and the user input sequence are configurable. The user interface may be configured during setup at runtime, e.g., before the user is logged in. The configuration is accomplished by reading a configuration file stored in the recording unit 14 which contains necessary data to display input screen and prompts, without any modification to the software. Thus, the configuration file may extend the user input sequence and expand the number of input screens to capture additional relevant data, e.g., employee identity.

Figure 4A:
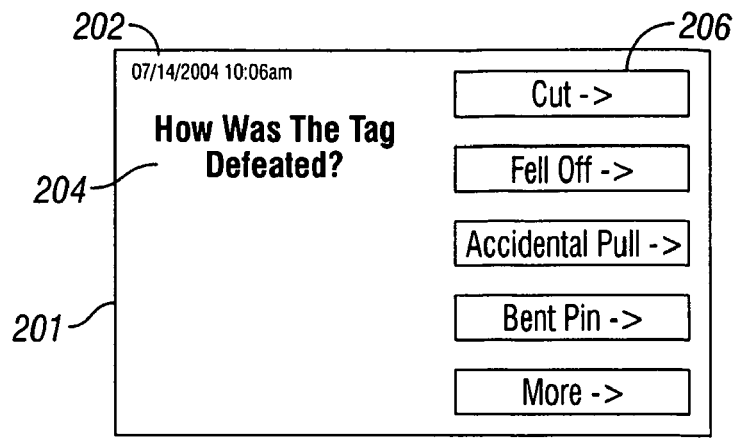
FIGS. 4A-C show an exemplary user interface for data logging of EAS tags.
Figure 4B:
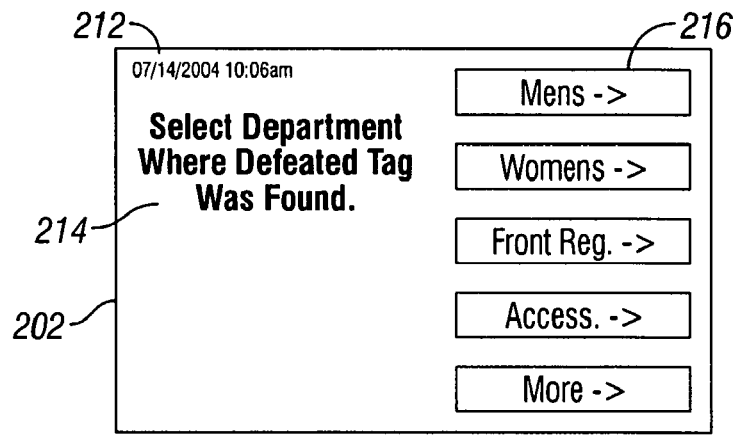
Figure 4C:
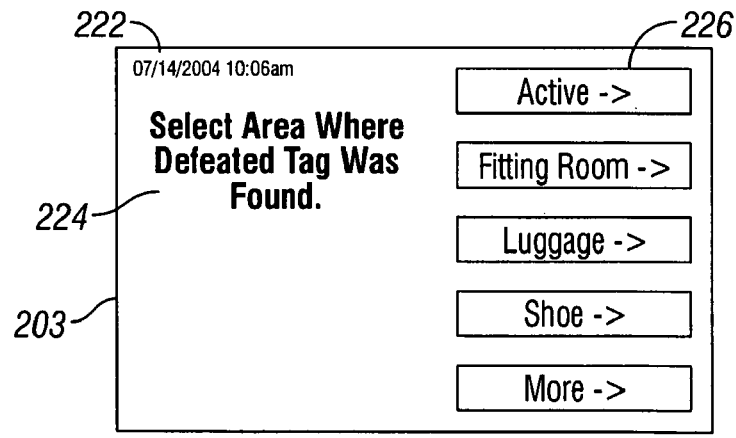

FIGS. 4A-C show an exemplary embodiment of a user interface for logging data pertaining to defeated EAS tags. FIG. 4A shows a first tag input screen 201, which displays a time stamp 202, a first tag query 204, and response selections 206. Although more than one tag query and its corresponding responses may be displayed on a screen at a time, in the exampled embodiment, each tag input screen corresponds to a single tag query so that the information entry process is simplified. The user may input information using the keypad 393 where keys correspond to the selections 206 (e.g., positioned on the edge of the display device) or a touch-screen, depending on the input device of the recording unit 14. The time stamp 202 is generated during step 104. The tag query 204 asks the user a question concerning the defeated EAS tag, in this case it relates to the method used to defeat the EAS tag. The user may select one of the selections 206 which outline the possible methods for defeating a EAS tag. The selections 206 may include options not shown in FIG. 4A, e.g., additional responses to the first tag query 204.

FIG. 4B shows a second tag input screen 211 including a time stamp 212, a second tag query 214, and response selections 216. The tag query 214 asks the user to enter the location where the defeated EAS tag was found, more specifically, the department of the store 2. The user then responds by selecting the department.

FIG. 4C shows a third tag input screen 221 including a time stamp 222, a third tag query 224, and response selections 226. The tag query 224 asks the user a follow up question to the tag query 214—to enter the area within the department where the defeated EAS tag was located. The user responds by entering one of the areas listed in the selections 226, e.g., the areas of the department previously selected in the selections 216.

Figure 5A:
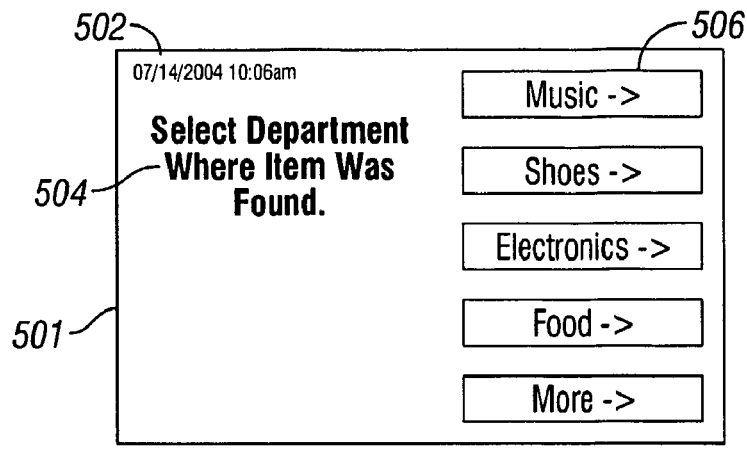
FIGS. 5A-C show an exemplary user interface for data logging of discarded merchandise packaging.
Figure 5B:
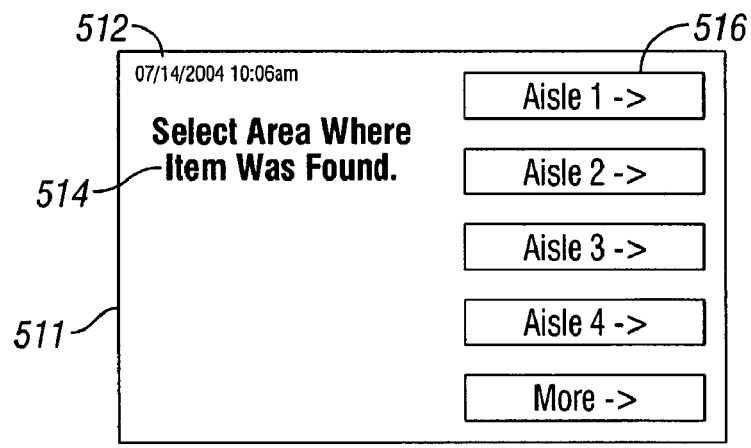
Figure 5C:
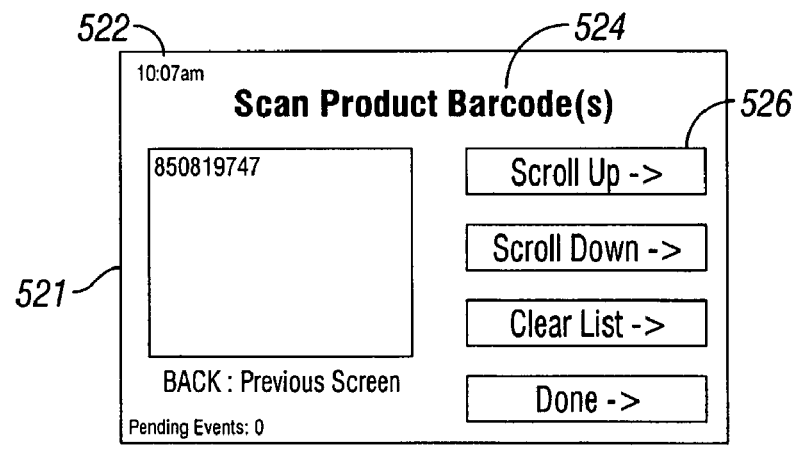

FIGS. 5A-C show an exemplary user interface for data logging of discarded merchandise packaging. FIG. 5A shows a first packaging input screen 501, which displays a time stamp 502, a first packaging query 504, and response selections 506. Similar to the tag input screens, more than one packaging query and its corresponding responses may be displayed on a screen at a time, in the present embodiment, each packaging input screen corresponds to a single packaging query. The packaging query 504 asks the user a question concerning the discarded merchandise packaging, in this case it relates to the location where the discarded packaging was found. The user may select one of the selections 506 which list the department of the store 2 where the discarded packaging was located.

FIG. 5B shows a second packaging input screen 511 including a time stamp 512, a second packaging query 514, and response selections 516. The packaging query 514 asks the user a follow up question to the packaging query 512—to enter the area within the department where the defeated EAS tag was located. The user responds by entering one of the areas listed in the selections 516, e.g., the areas of the department previously selected in the selections 506.

FIG. 5C shows a third packaging input screen 521 including a time stamp 522, a third packaging query 524, and response selections 526. The packaging query 524 asks the user to enter the product identifying information located on the discarded packaging. This may be entered from the UPC code either by using the scanning arrangement 399 or by inputting the code through the keypad 393.

Once the data concerning the missing merchandise is inputted into the recording unit 14, the user may also deactivate the defeated EAS tag if required. Some EAS tags are not completely destroyed and are simply detached from the merchandise. Such EAS tags are still active and must be deactivated to prevent them from causing false alarms within the EAS system. This may be accomplished by using the EAS deactivator 400 which is part of the recording unit 14. The EAS deactivator 400 functions in substantially the same manner as the deactivator 10 (e.g., electronically deactivates the EAS tag and transmit the data to the EAS system).

After the data about the missing merchandise is collected, in step 108, the recording unit 14 transmits the data to the data processing unit 18 using the network 16. The data processing unit 18 analyzes the defeated EAS tag data and/or the discarded packaging data. In addition, the data processing unit 18 may combine that data with other information, such as store occupancy figures. For instance, the data processing unit 18 may correlate the locations and times of the discoveries of missing merchandise with the data on store occupancy to isolate specific areas and times preferred by shoplifters within the store 2.

In step 110, the data processing unit 18 generates a report having the data pertaining to missing merchandise. The report may then be analyzed by the staff of the store 2 to determine the best counter-measures on dealing with the shoplifters and targeting the designated problem areas. For instance, the report may identify a department within the store 2 with the most shoplifted items as well as the times when a majority of the shoplifting incidents occurred. In response to this data the staff of the store 2 may deploy additional security personnel to conduct more patrols in the identified departments, specifically during certain times when shoplifting is most common. Furthermore, the report may provide insight into the most common methods used for defeating the EAS tags and/or removing merchandise from its packaging, thereby allowing for development of more destruction-proof EAS tags and packaging.

Figure 6:
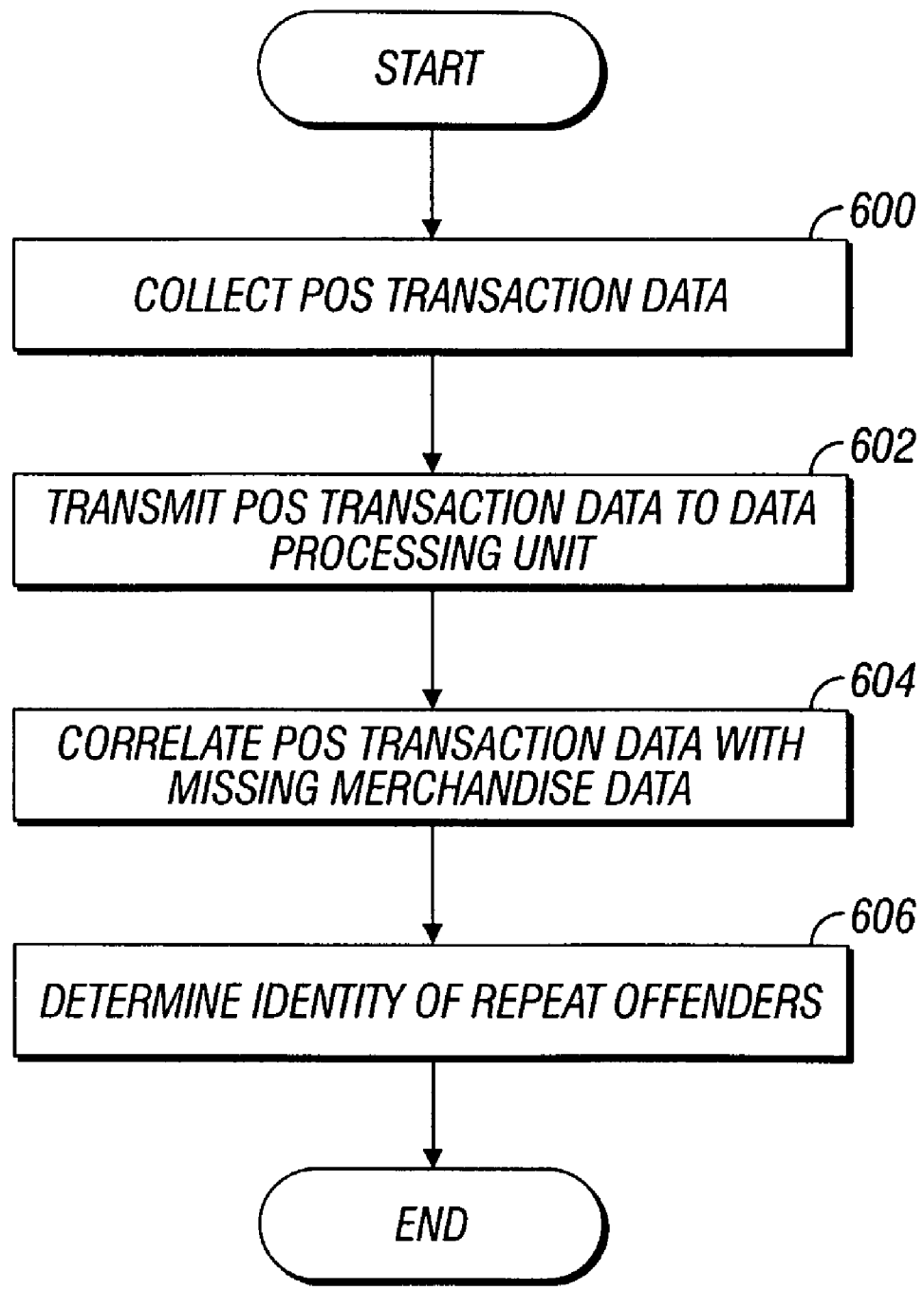
FIG. 6 is a flow diagram showing a method for generating a report based on the data pertaining to the EAS tags.

FIG. 6 is a flow diagram showing a method for generating an exemplary report based on the data pertaining to the EAS tags. More specifically, the data processing unit 18 collects additional data pertaining to various POS transactions in an attempt to identify individuals that may be responsible for the removing the merchandise from the store 2. It is common for shoplifters to purchase items using their credit cards in order to look like legitimate purchasers. After purchasing some items and gaining credibility, shoplifters then steal other merchandise by defeating EAS tags and/or removing merchandise from packaging. Usually, shoplifters return the items they initially purchased to disguise their activities and at the same time repeat the cycle again.

All of the above transactions associated with purchasing and returning merchandise are generally recorded by the POS station 6 in step 600 and then transmitted to the data processing unit 18 through the network 16 in step 602. Information pertaining to POS transactions may include the credit card number (e.g., last four digits thereof), date, time, item UPC code. In step 604, this information is correlated by the data processing unit 18 with the data received from the recording unit 14 pertaining to the missing merchandise to determine the identity of serial shoplifters. For example, if the date and time of purchases and/or returns of certain items coincide with the date, time, and location of the discovery of the missing merchandise (or coincides generally, i.e., one or two days since the defeated EAS tag is found and the other purchases are made), it is probable that the person who purchased the items shoplifted the other items. Therefore, in step 606, the person's identity may be determined by using the last four digits of the credit numbers and the managers of the store 2 may be able to track repeated offenders and may act accordingly to stop the shoplifters (e.g., by reporting them to proper authorities).

The invention according to the present disclosure automates the process of collecting and storing data regarding missing merchandise, more specifically the information pertaining to the defeated EAS tags and discarded merchandise packaging. The invention also provides a simple and consistent user interface for recording such information. Therefore, the invention greatly reduces the amount of time required to enter and compile such data into a meaningful form and reduces data recording errors. In addition, the compiled data may be sent for further processing to obtain detailed reports on trends associated with the defeated EAS tags.

Those skilled in the art will appreciate that the recording unit according to the present invention may be implemented in a variety of forms and devices. As discussed above certain retail environments require that the recording unit be in the form of a terminal while other environments are better served by using recording units of more portable variety (e.g., mobile units). It is also envisioned that the recording unit may include a plurality of peripheral devices, such as a bar code scanner and an EAS deactivator which enable the recording unit to properly identify missing merchandise and deactivate or detach EAS tags if necessary.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A method for collecting information pertaining to a defeated electronic article surveillance (EAS) tag, comprising the steps of:
   locating evidence of missing merchandise within an area protected by an electronic article surveillance (EAS) system, wherein the evidence of missing merchandise includes at least one of a discarded EAS tag or discarded packaging materials indicative of a missing article;
   providing a recording unit for collecting data pertaining to missing merchandise having at least one user interface;
   recording the missing merchandise data into the recording unit in response to a series of user interface prompts displayed on the recording unit, the interface prompts being programmed according to a predetermined user input sequence, the recording unit being adapted to transmit the data through a communications network;
   providing at least one point-of-sale (POS) station operable to record POS transaction data associated with merchandise purchases and merchandise returns; and
   transmitting the missing merchandise data and the POS transaction data through the communications network to a data processing unit, the data processing unit being configured to analyze the data and to generate a report which correlates shoplifting patterns based on the data.

2. The method as in claim 1, wherein the missing merchandise data includes information selected from the group consisting of information relating to a method used to defeat the EAS tag, information relating to a location of the defeated EAS tag, information relating to identification of the discarded merchandise packaging, information relating to a location of the discarded merchandise packaging, and information relating to the number of the defeated EAS tags.

3. The method as in claim 1, wherein the user interface prompts include a query and at least one response selection.

4. The method as in claim 1, wherein the step of recording the missing merchandise data further comprises the step of:
   providing time and date information relating to the data.

5. The method as in claim 1, wherein the communications network includes at least one wireless interface.

6. The method as in claim 1, wherein the user input sequence is setup at runtime from a configuration file.

7. The method as in claim 1, wherein the user input sequence is configurable.

8. The method as in claim 1, wherein the POS transaction data includes an item identifier for an item associated with the transaction and the date and time of the transaction.

9. The method as in claim 8, wherein the item identifier is a UPC code.

10. The method as in claim 1, wherein the POS transaction data includes identity information associated with the individual initiating the transaction.

11. The method as in claim 10, wherein the identity information includes at least a portion of a financial card account number.

12. The method as in claim 10, wherein the report generated by the data processing unit can be used to determine the probable identity of serial shoplifters based on the identity information.

13. A system for collecting information pertaining to a defeated electronic article surveillance (EAS) tag, comprising:
   a recording unit for collecting data pertaining to missing merchandise wherein the missing merchandise is evidenced by at least one of a discarded EAS tag or discarded merchandise packaging discovered within an area protected by an EAS system, the recording unit having at least one user interface to record the missing merchandise data into the recording unit in response to a series of user interface prompts displayed on the recording unit, the interface prompts being programmed according to a predetermined user input sequence, the recording unit being adapted to transmit the missing merchandise data through a communications network;
   at least one point-of-sale (POS) station operable to record POS transaction data associated with merchandise purchases and merchandise returns and transmit the POS transaction data though a communications network; and a data processing unit to receive and process the missing merchandise data and the POS transaction data, the data processing unit being configured to analyze the data and to generate a report based on the data which correlates shoplifting patterns.

14. The system as in claim 13, wherein the missing merchandise data includes information selected from the group consisting of information relating to a method used to defeat the EAS tag, information relating to a location of the defeated EAS tag, information relating to identification of the discarded merchandise packaging, information relating to a location of the discarded merchandise packaging, and information relating to the number of the defeated EAS tags.

15. The system as in claim 13, wherein the user interface prompts include a query and at least one response selection.

16. The system as in claim 13, the recording unit provides a time and date information for the missing merchandise data.

17. The system as in claim 13, wherein the communications network includes at least one wireless interface.

18. The system as in claim 13, wherein the user input sequence is setup at runtime from a configuration file.

19. The system as in claim 13, wherein the user input sequence is configurable.

20. The system as in claim 13, wherein the POS transaction data includes an item identifier for an item associated with the transaction and the date and time of the transaction.

21. The system as in claim 20, wherein the item identifier is a UPC code.

22. The system as in claim 13, wherein the POS transaction data includes identity information associated with the individual initiating the transaction.

23. The system as in claim 22, wherein the identity information includes at least a portion of a financial card account number.

24. The system as in claim 22, wherein the report generated by the data processing unit can be used to determine the probable identity of serial shoplifters based on the identity information.

* * * * *